US006933632B2

United States Patent
Braml et al.

(10) Patent No.: US 6,933,632 B2
(45) Date of Patent: Aug. 23, 2005

(54) COMMUTATING ROTARY SWITCH

(75) Inventors: Georg Braml, Landsberg (DE);
Ernst-Rudolf Lübkert, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 82 days.

(21) Appl. No.: 10/435,111

(22) Filed: May 8, 2003

(65) Prior Publication Data

US 2003/0209951 A1 Nov. 13, 2003

(30) Foreign Application Priority Data

May 10, 2002 (DE) .......................... 102 20 793

(51) Int. Cl.$^7$ ............................................. H02K 13/00
(52) U.S. Cl. ......................... 310/50; 310/71; 310/241
(58) Field of Search ..................... 310/50, 71, 241, 310/68 A, 239, 238, 46, 47; 200/1 V; 29/596–598

(56) References Cited

U.S. PATENT DOCUMENTS 4,968,922 A * 11/1990 Bittel .......................... 318/280
5,196,747 A * 3/1993 Kress et al. ................... 310/89
5,955,802 A * 9/1999 Karasa et al. .................. 310/50

FOREIGN PATENT DOCUMENTS

DE 3731079 3/1989
DE 3943651 1/1993

* cited by examiner

Primary Examiner—Darren Schuberg
Assistant Examiner—Leda Pham
(74) Attorney, Agent, or Firm—Sidley Austin Brown & Wood, LLP

(57) ABSTRACT

A turning-pivoting commutating rotary switch (1) with brush guides (2) for reversing the direction of rotation of a universal motor, which has two stator contacts (3a, 3b) each making contact with a contact rail (5a, 5b) running partially peripherally at at least one contact point (4a, 4b, 4c), which are conducting connected with the two diametrically opposing brush guides (2), wherein a contact rail (5a) with two contact points (4a, 4b) extends over at least a half periphery and wherein both stator contacts (4a, 3b), at which at least one contact point (4a, 4b, 4c) can be rotatably switchable at a contact rail (5a, 5b) running partially peripherally, are arranged on only one side of the stator (6).

7 Claims, 1 Drawing Sheet

COMMUTATING ROTARY SWITCH

BACKGROUND OF THE INVENTION

Figure 1:
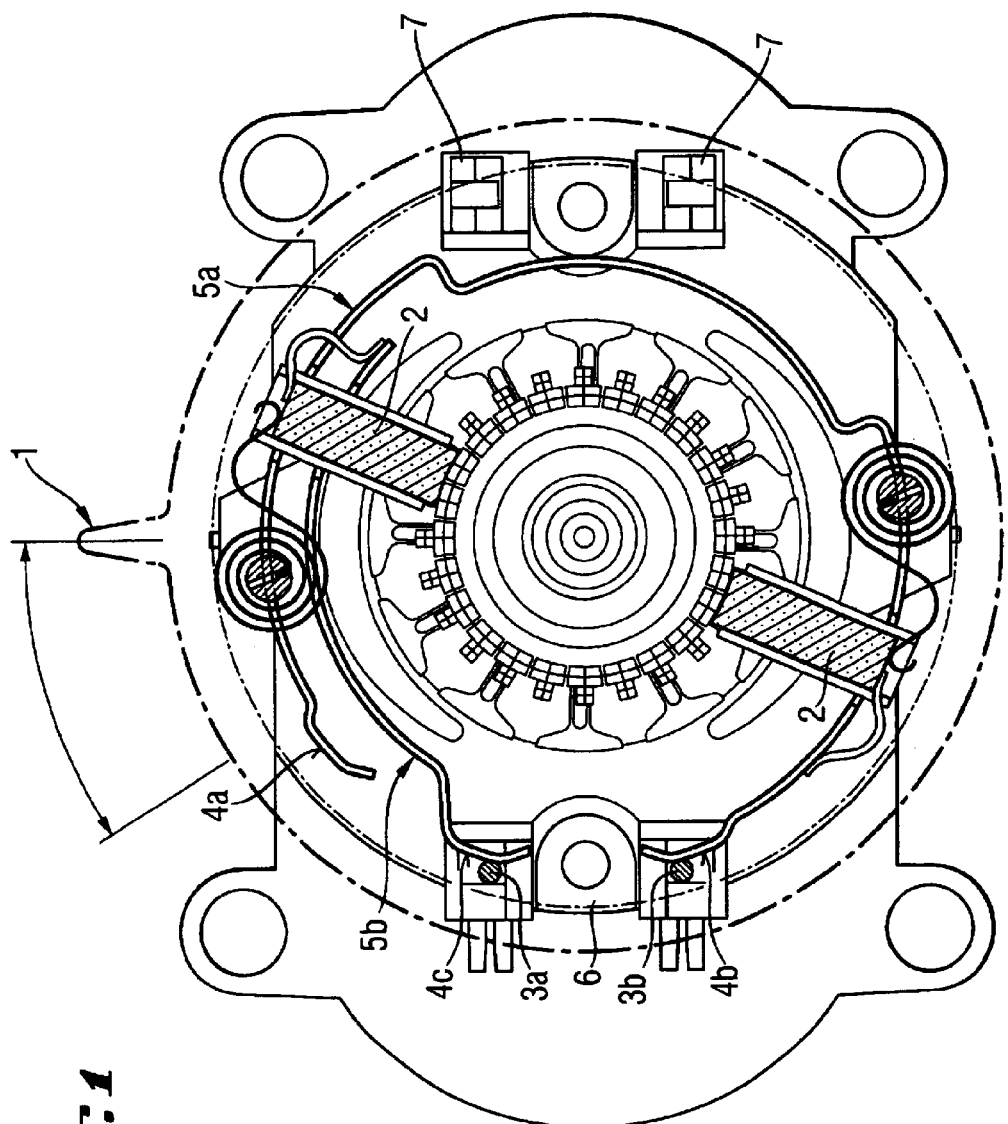

The invention concerns a turning-pivoting commutating rotary switch with brush guides for reversing the direction of rotation of a universal electrical motor, preferably for use in hand tool machines or power tools.

Conventionally, a turning-pivoting brush holder with brush guides configured as a turning-pivoting commutating rotary switch for reversing rotational direction features two diametrically opposed stator contacts, each making contact with two diametrically opposing, partially peripheral contact bars at two contact points, which are conducting connected with the two diametrically opposing brush guides. Consequently, upon pivoting, the commutator rotary switch, on the one hand, by the intermittent contact of the contact points, with the stator contacts, the armature coil pole is reversed, and, on the other hand, the brush guides pivot out of the polar plane as a factor of the direction of rotation. The invention relates to such a commutating rotary switch.

According to DE3731079 or DE3943651, such commutating rotary switches have two diametrically opposing stator contacts, wherein structural space is bilaterally required. Such a space is especially tight in hand tools.

According to DE 37 44 488, a switch ring for a universal electrical motor equipped with two separate, diametrically opposing bridge circuit contacts makes contact with a punched grid that is connected with both stator contacts at only one side of the stator. The fixed brush holder can be switched over the bridge circuit contacts for reversal of the direction of rotation. Heavy brush sparking results through the brush guide due to the armature reaction under heavy load, wherein said brush sparking increasing the wear on the brushes. The brush guide is fixed connected with the punched grid and thus unable to pivot out of the polarization plane as a factor of rotational direction. Further, additional intercircuits between the stator contacts and the bridge contacts are required, whereby the switch ring, itself multi-part, must be rotatable.

According to DE 19 521 702, a low voltage d.c. machine has two partially peripheral, rigid pole connection lines arranged on a fixed brush bridge between the brush mountings, wherein at least one pole connection line extends over half of the periphery.

SUMMARY OF THE INVENTION

The object of the invention is to provide a turning-pivoting commutating rotary switch with brush holders that conserves structural space. A further object of the invention is to provide a one-piece turning-pivoting commutating rotary switch with a minimum number of component parts.

This object is achieved, according to the invention, by a rotational commutating rotary switch having brush holders or guides for reversal of rotational direction having two stator contacts, each making contact with a partially peripheral contact rail on at least one contact point that is connected conducting with the two diametrically opposing brush guides, wherein a contact rail with two contact points extends over at least a half of the periphery and, wherein both stator contacts are arranged on only one side of the stator, and wherein at least one rotatably switched contact point is associated with a partially peripheral contact rail.

The two stator contacts arranged on only one side of the stator can be alternatingly switched by virtue of the contact rails extending over a half periphery and having two contact points, whereby, depending on the direction of rotation, both the armature coil is reverse polarized and the brush guide is rotated. The free space on the other side of the stator is thus made available for other components.

Preferably, the contact rail has precisely one contact point, alternating switchable to the two stator contacts, whereby reliability is improved.

Preferably, the two contact rails are radially separated, disposed in one plane, whereby axial structural space can be economized.

Preferably, the contact rails are configured at least in part as resilient contact flat springs, whereby the contact resistance at the stator contact is reduced.

Preferably, the commutating rotary switch is executed in one piece and mounted rotatable directly on the universal motor, whereby supplementary intercircuits from the stator contacts to the contact rails and rotational mountings between the parts of the commutating rotary switch are eliminated.

Preferably, the power supply connection of the universal motor is arranged on the longitudinal side of the stator disposed opposite to the stator contacts, whereby the conserved structural space is appropriately utilized.

BRIEF DESCRIPTION OF THE INVENTION

The invention will now be more completely described below with reference to the following drawing wherein:

FIG. 1 shows a commutating rotary switch in accordance with the invention.

DETAILED DESCRIPTION OF THE INVENTION

FIG. 1 shows a virtual turning-pivoting commutating rotary switch 1 with brush guides 2 for reversal of rotational direction of an universal motor (represented open on the commutator side) has two stator contacts 3a, 3b. The stator contacts 3a, 3b each make contact at at least one contact point 4a, 4b, 4c of a contact rail 5a, 5b represented herein as running partially peripherally in the form of partially resilient contact flat springs, that are conducting connected with two diametrically opposing brush guides 2. A contact rail 5a extends with two contact points 4a, 4b over a half periphery of approximately 300°. The other contact rail 5b has precisely one contact point that alternating switches to the two contact points 3a, 3b. Both contact rails 5a, 5b are radially separated and disposed axially in one plane. Both stator contacts 3a, 3b, with which at least one contact point 4a, 4b, 4c can be rotatably switchably assigned on each partially peripheral contact rail 5a, 5b, are arranged on only one side of the stator 6. The power supply connection 7 is arranged in the form of a plug box on the longitudinal side of the stator 6 situated opposite to the stator contacts 3a, 3b. The commutating rotary switch 1 mounted rotatable directly on the universal motor is configured in one piece. Additional intercircuits between the stator contacts 3a, 3b and the contact rails 5a, 5b are not present since the contact points of the contact rails 4a, 4b, 4c are assigned directly to the positions of the stator contacts 3a, 3b.

What is claimed is:

1. A turning-pivoting commutating rotary switch rotatable in a switching plane and mountable directly on a stator (6) of a universal motor with brush guides (2) for reversing the direction of rotation of a universal motor, said switch having two stator contacts (3a, 3b) each making contact with a contact rail (5a, 5b) running partially peripherally at at least one contact point (4a, 4b, 4c), said at least one contact point (4a, 4b, 4c) is conducting connected to the two diametrically opposing brush guides (2), wherein a contact rail (5a) with two contact points (4a, 4b) extends at least halfway peripherally and wherein both stator contacts (3a, 3b) are arranged on only one side in said switching plane of said stator (6) and wherein at least one contact point (4a, 4b, 4c) can be arranged rotatably switchable on a contact rail (5a, 5b) running partially peripherally.

2. The commutating rotary switch of claim 1, wherein contact rail (5b) has precisely one contact point that alternating switches both stator contacts (3a, 3b).

3. The commutating rotary switch of claim 1, wherein the two contact rails (5a, 5b) are radially separated and disposed in one plane.

4. The commutating rotary switch of claim 1, wherein the contact rails (5a, 5b) are at least partially resilient contact flat springs.

5. The commutating rotary switch of claim 1, wherein the commutating rotary switch is one piece.

6. The commutating rotary switch of claim 1, wherein the commutating rotary switch is rotatably mounted directly on a universal motor.

7. The commutating rotary switch of claim 6, wherein a power supply connection (7) of the universal motor is arranged on a longitudinal side of the stator (6) opposite to the stator contacts (3a, 3b).

* * * * *